US008989296B2

(12) United States Patent
Koo et al.

(10) Patent No.: US 8,989,296 B2
(45) Date of Patent: Mar. 24, 2015

(54) OPERATING METHOD OF WIRELESS LOCAL AREA NETWORK STATION

(71) Applicants: Samsung Electronics Co., Ltd., Gyeonggi-do (KR); Industry-Academic Cooperation Foundation, Yonsei University, Seoul (KR)

(72) Inventors: Ji-Hun Koo, Gyeonggi-do (KR); Jang-Yong Park, Seoul (KR); Min-Joon Kim, Seoul (KR); Jae-Seok Kim, Seoul (KR); Hyun-Sub Kim, Seoul (KR)

(73) Assignees: Samsung Electronics Co., Ltd., Suwon-Si, Gyeonggi-Do (KR); Industry-Academic Cooperation Foundation, Yonsei University, Seoul (KR)

( * ) Notice: Subject to any disclaimer, the term of this patent is extended or adjusted under 35 U.S.C. 154(b) by 0 days.

(21) Appl. No.: 14/012,372

(22) Filed: Aug. 28, 2013

(65) Prior Publication Data

US 2015/0023441 A1 Jan. 22, 2015

(30) Foreign Application Priority Data

Jul. 17, 2013 (KR) .......................... 10-2013-0084230

(51) Int. Cl.
*H04B 7/02* (2006.01)
*H04B 7/04* (2006.01)

(52) U.S. Cl.
CPC ............ *H04B 7/0456* (2013.01); *H04B 7/0452* (2013.01)
USPC ...................................................... 375/267

(58) Field of Classification Search
CPC ............... H04B 7/0456; H04B 7/0639; H04L 25/03828; H04L 25/03343
USPC ............................ 375/346, 296, 284, 267, 347
See application file for complete search history.

(56) References Cited

U.S. PATENT DOCUMENTS

| 2006/0146965 | A1 | 7/2006 | Kwun et al. |
| 2010/0232534 | A1* | 9/2010 | Lee et al. ................ 375/267 |
| 2010/0266056 | A1 | 10/2010 | Lee et al. |
| 2013/0102256 | A1* | 4/2013 | Cendrillon et al. ......... 455/63.4 |

FOREIGN PATENT DOCUMENTS

| EP | 1 224 749 | 9/2003 |
| KR | 1020080042383 | 5/2008 |
| KR | 1020100079216 | 7/2010 |
| WO | 01/31812 | 5/2001 |
| WO | 2010/077086 | 7/2010 |

OTHER PUBLICATIONS

Jangyong Park, Minjoon Kim, Hyunsub Kim, and Jaeseok Kim, "A High Performance MIMO Detection Algorithm for DL MU-MIMO with Practical Errors in IEEE 802.11ac Systems", 2013 IEEE International Symposium on Personal, Indoor, and Mobile Radio Communications (PIMRC 2013), Sep. 9, 2013.

Quentin H. Spencer, A. Lee Swindlehurst, Martin Haardt, "Zero-Forcing Methods for Downlink Spatial Multiplexing in Multiuser MIMO Channels", IEEE Transactions on Signal Processing, vol. 52, No. 2, Feb. 2004, pp. 461-471.

* cited by examiner

*Primary Examiner* — Kevin Kim
(74) *Attorney, Agent, or Firm* — F. Chau & Associates, LLC

(57) ABSTRACT

A method of operating a wireless local area network (WLAN) station. The WLAN station receives at least one desired signal and at least one interference signal from an access point (AP) capable of simultaneously transmitting desired signals to multiple WLAN stations. The method includes estimating a channel and generating a channel matrix estimated based on the estimated channel, separating a channel matrix of the desired signal and a channel matrix of the interference signal from the estimated channel matrix, generating the matrix of a virtual channel by combining the separated channel matrixes, and executing a sphere decoding (SD) algorithm using the matrix of the virtual channel.

Or, separating a desired signal and an interference signal from the stream signal based on the analysis result, ascertaining a modulation scheme of the interference signal, and setting the ascertained modulation scheme of the interference signal as decreased lattice points.

20 Claims, 7 Drawing Sheets

OPERATING METHOD OF WIRELESS LOCAL AREA NETWORK STATION

CROSS-REFERENCE TO RELATED APPLICATION

This application claims priority under 35 U.S.C. §119 to Korean Patent Application No. 10-2013-0084230 filed on Jul. 17, 2013, which is hereby incorporated by reference in its entirety.

TECHNICAL FIELD

Exemplary embodiments of the inventive concept relate to a wireless local area network (WLAN) station, and more particularly, to an operation method of a WLAN station for removing interference signals in a down-link (DL) multiple user multiple input multiple output (MU-MIMO) orthogonal frequency division multiplexing (OFDM) system.

DISCUSSION OF RELATED ART

The convenience of using wireless devices (e.g., laptops, tablets, smartphones, etc) has increased with enhancements to the function of wireless access points (AP) or base stations (BS) in the home and at commercial sites. Originally, access points were implemented as conventional SISO (single-input single-output) systems. Multiple-input and multiple-output (MIMO) (pronounced mee-moh or my-moh) technologies exploit the availability of multiple independent radio terminals in order to enhance the communication capabilities of each individual terminal. Single-user MIMO only considers access to the multiple antennas that are physically connected to each individual terminal. Multi-user MIMO (MU-MIMO) is a set of advanced MIMO, multiple-input and multiple-output, technologies MU-MIMO can be seen as the extended concept of space-division multiple access (SDMA) which allows a terminal to transmit (or receive) signal to (or from) multiple users in the same band simultaneously. There are two different approaches which are Downlink MU-MIMO and Uplink MU-MIMO schemes. For both downlink and uplink MU-MIMO schemes, signal processing for interference cancellation is required to achieve high throughput performance. Multi-user MIMO can leverage multiple users as spatially distributed transmission resources, at the cost of somewhat more expensive signal processing.

In a down-link (DL) multiple user multiple input multiple output (MU-MIMO) orthogonal frequency division multiplexing (OFDM) system, a base station (BS) or an access point (AP) performs communication with a large number of stations. In this case, each station receives other signals other than a desired signal that it is intended to receive, the other signals being interference signals. Accordingly, interference may occur between stations.

The received interference signals may disturb detection of desired signals, and in this way, a wireless local area network (WLAN) station may suffer performance degradation. In order to overcome this problem, in a multi-user system, conventionally a precoding technology is used. In the precoding technology, signals are multiplied by a precoding matrix created using channel state information (CSI) in a base station (BS) or an access point (AP) and the multiplication result is transmitted, and therefore only desired signals are transmitted to each of stations. The WLAN station uses the precoding technology, and therefore each station may receive and detect only the desired signals without interference signals. In the conventional technology, a receiving station considers only the desired signals under the assumption that precoding in the BS or the AP is perfect.

However, in an actual communication environment, since feedback data is quantized in units of bits and then transmitted, it is impossible to transmit data without errors, and there are also channel estimation errors. Accordingly, the precoding is not perfectly performed.

Consequently, each station receives interference signals to a certain degree. Values of the received interference signals may be relatively smaller than those of desired signals. However, increase in the number of users may result in the sum of the values of the interference signals becoming large enough to adversely affect detection of the desired signals. Therefore, performance of the WLAN station can be degraded, or an error floor phenomenon may occur.

SUMMARY

An aspect of the inventive concept provides a method of operating a wireless local area network (WLAN) station that can additionally detect interference signals and remove the additionally detected interference signals to reduce total interference, thereby enhancing reception performance.

In accordance with an aspect of the inventive concept, a method of operating a wireless local area network (WLAN) station that receives at least one desired signal and at least one interference signal through at least one station antenna from an AP including at least one access point (AP) antenna and supporting down-link (DL) multiple user multiple input multiple output (MU-MIMO), the driving method comprising: estimating a channel and generating a estimated channel matrix based on the estimated channel; separating a channel matrix of the desired signal and a channel matrix of the interference signal from the estimated channel matrix; and detecting the desired signal and the interference signal using the separated channel matrix of the desired signal and the separated channel matrix of the interference signal.

In some embodiments, the driving method may further include: calculating Norm values of channel column vectors with respect to the channel matrix of the interference signal; extracting N channel column vectors in a descending order of the Norm values based on the calculation result; generating a channel matrix of the extracted interference signal by combining the extracted N channel column vectors; and generating the matrix of a virtual channel by combining the channel matrix of the desired signal and the channel matrix of the extracted interference signal.

In an embodiment, the detecting of the desired signal and the interference signal may include executing a sphere decoding (SD) algorithm using the matrix of the virtual channel.

In an embodiment, the calculating of the Norm values may include calculating the size of the channel column vector with respect to the channel matrix of the interference signal.

In an exemplary embodiment, the driving method may further include multiplying, wherein the multiplying is performed by the AP, a precoding matrix that is created using channel state information (CSI) by a stream signal, and transmitting the multiplication result to the WLAN station through the at least one AP antenna.

In an exemplary embodiment, the driving method may further include receiving the stream signal through the at least one station antenna in accordance with 802.11 ac protocol.

In an exemplary embodiment, the driving method may further include modulating, wherein the modulating is performed by the AP, each of the desired signal and the interference signal in a quadrature amplitude modulation (QAM) scheme.

In an exemplary embodiment, the driving method may further include ascertaining a modulation scheme of each of the desired signal and the interference signal; and detecting each of the desired signal and the interference signal using lattice points corresponding to the ascertained modulation scheme.

In accordance with another aspect of the inventive concept, a method of operating a WLAN station that receives a stream signal from an AP, and supports DL MU-MIMO, includes: analyzing the stream signal, wherein the analyzing is performed by the WLAN station; separating a desired signal and an interference signal from the stream signal based on the analysis result; ascertaining a modulation scheme of the interference signal; and setting the ascertained modulation scheme of the interference signal as first lattice points corresponding to a modulation scheme having fewer lattice points than the ascertained modulation scheme of the interference signal.

In some embodiments, the driving method may further include ascertaining a modulation scheme of the desired signal; and setting the ascertained modulation scheme of the desired signal as second lattice points corresponding to the ascertained modulation scheme of the desired signal.

In an embodiment, the driving method may further include generating a set of lattice points by combining the first lattice points and the second lattice points.

In an embodiment, the setting of the ascertained modulation scheme of the interference signal as the first lattice points may include setting the ascertained modulation scheme of the interference signal as fewer lattice points than the second lattice points.

In an exemplary embodiment, the driving method may further include detecting the interference signal using the first lattice points.

In an exemplary embodiment, the setting of the ascertained modulation scheme of the desired signal as the second lattice points includes setting the ascertained modulation scheme of the desired signal as lattice points corresponding to the ascertained modulation scheme of the desired signal.

In an exemplary embodiment, the driving method may further include detecting the desired signal using the second lattice points.

The inventive concept is not limited to the above exemplary embodiments; various other embodiments may become apparent to those of ordinary skill in the art based on the following descriptions.

Various embodiments will now be described more fully with reference to the accompanying drawings in which some embodiments are shown. These inventive concepts may, however, be embodied in different forms and should not be construed as limited to the embodiments set forth herein. Rather, these embodiments are provided so that this disclosure is thorough and complete and fully conveys the inventive concept to those skilled in the art.

Like numerals refer to like elements throughout. As used herein, the term "and/or" includes any and all combinations of one or more of the associated listed items.

It will be understood that, although the terms first, second, third, etc. may be used herein to describe various elements, components, these elements, components, should not be limited by these terms. These terms are only used to distinguish one element, component, from another. Thus, a first element, component discussed below could be termed a second element, component without departing from the teachings of the present inventive concept.

The terminology used herein is for the purpose of describing particular embodiments only and is not intended to be limiting of the present inventive concept. As used herein, the singular forms "a," "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this inventive concept belongs.

BRIEF DESCRIPTION OF THE DRAWINGS

The foregoing and other features of the inventive concept will be apparent from the more particular description of preferred embodiments of the inventive concepts, as illustrated in the accompanying drawings in which like reference characters refer to the same respective parts throughout the different views. In the drawings.

DETAILED DESCRIPTION OF THE EXEMPLARY EMBODIMENTS

Figure 1:
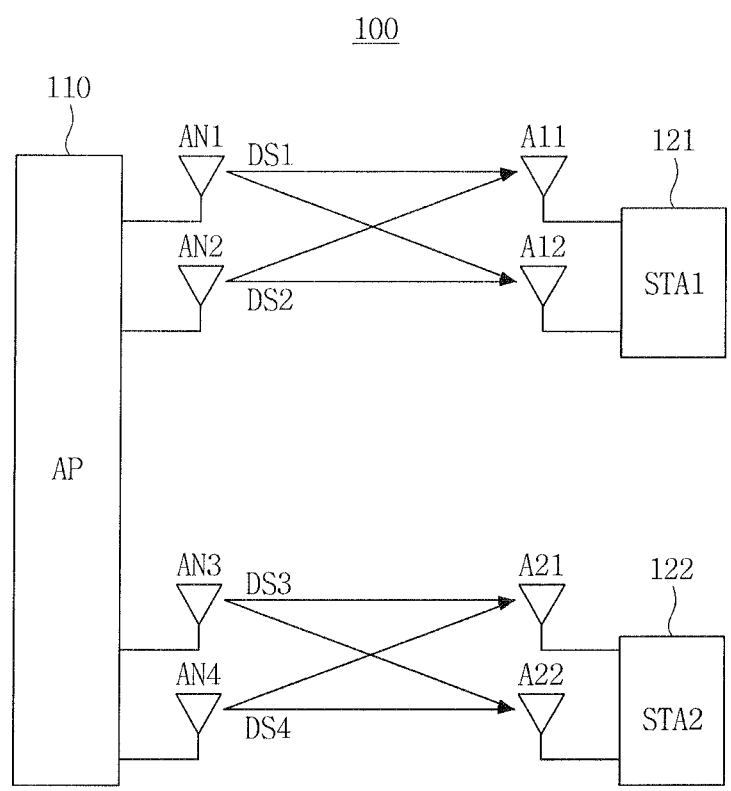
FIG. 1 is a block diagram of a wireless local area network (WLAN) system.

FIG. 1 is a block diagram of a wireless local area network (WLAN) system.

Referring to FIG. 1, the WLAN system 100 supports downlink (DL) multiple user multiple input multiple output (MU-MIMO).

The WLAN system 100 includes an access point (AP) 110 supporting DL MU-MIMO, a first WLAN station 121, and a second WLAN station 122.

In addition, the WLAN system 100 may further include more than two stations.

The first WLAN station 121 includes first and second station antennas A11 and A12. The second WLAN station 122 includes first and second station antennas A21 and A22.

The AP 110 includes first to fourth AP antennas AN1 to AN4. The AP 110 may include more than four antennas.

The AP 110 estimates channels in order to transmit data to the first or second WLAN station 121 or 122. Through this estimation, the AP 110 may obtain channel state information (CSI).

The AP 110 multiplies a precoding matrix created using the CSI by stream signals and transmits the multiplication result. Through this, the AP 110 may transmits only desired signals, without interference signals, to the WLAN stations 121 and 122.

The AP 110 may transmit first and second desired signals DS1 and DS2 to the first and second station antennas A11 and A12 of the first WLAN station 121 through the first and second AP antennas AN1 and AN2.

The AP 110 may transmit third and fourth desired signals DS3 and DS4 to the first and second station antennas A21 and A22 of the second WLAN station 122 through third and fourth AP antennas AN3 and AN4.

The following Equation 1 shows a relational formula among a reception signal vector $y_i$ that an i-th WLAN station among U users receives, a transmission signal vector x, a precoding matrix V, a channel matrix H, and noise n in the WLAN system 100 of a multiuser multi-input multi-output orthogonal frequency division multiplexing (MIMO-OFDM) down link (DL) assuming that there are no interference signals.

$$y_i = H_i V x + n \quad \text{[Equation 1]}$$
$$= H_i V_i x_i + \underbrace{\sum_{j=1, j \neq i}^{U} H_i V_j x_j}_{=0} + n$$
$$= \underbrace{\hat{H} x_i}_{\text{desired signal}} + \underbrace{n}_{\text{noise}}$$

In Equation 1, $H_i$ denotes a channel matrix that reaches the i-th WLAN station, and $x_i$ and $V_i$ respectively denote a partial vector and matrix corresponding to the i-th WLAN station. $\hat{H}$ denotes a channel matrix estimated by the i-th WLAN station, and satisfies $\hat{H}=H_i V_i$. Accordingly, assuming that values of interference signals in the WLAN system 100 are all zero, each of the first and second WLAN stations 121 and 122 may receive only desired signals (DS) and noise (n).

Figure 2:
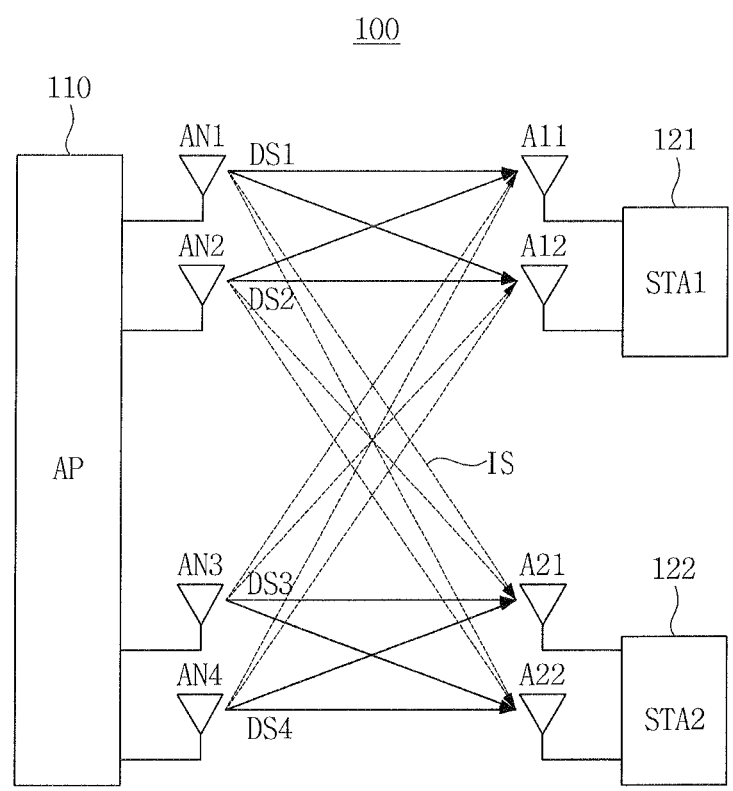
FIG. 2 is a block diagram of the WLAN system of FIG. 1 illustrating interference signal paths.

FIG. 2 is a block diagram of the WLAN system of FIG. 1 illustrating interference signal paths.

Referring to FIG. 2, in practice, the WLAN system 100 may be affected by interference signals (IS). Thus, when the AP 110 transmits first to fourth desired signals DS1 to DS4 to each of the first and second WLAN stations 121 and 122, interference signals (IS) may be generated by each of the first to fourth desired signals DS1 to DS4. For example, when the AP 110 transmits the first and second desired signals DS1 and DS2 to the first and second station antennas A11 and A12 of the first WLAN station 121 through the first and second AP antennas AN1 and AN 2, the first and second desired signals DS1 and DS2 may act as the interference signals (IS) with respect to the first and second station antennas A21 and A22 of the second WLAN station 122.

Next, referring to FIG. 2, in the WLAN system 100, errors may occur in a precoding matrix due to errors of feedback bit quantization and errors of channel estimation. Accordingly, as shown in the following Equation 2, values of interference signals are not all zero in the WLAN system 100, and each of the first and second WLAN stations 121 and 122 may receive desired signals (DS), interference signals (IS), and noise (n, not shown).

$$y_i = H_i V x + n \quad \text{[Equation 2]}$$
$$= H_i V_i x_i + \underbrace{\sum_{j=1, j \neq i}^{U} H_i V_j x_j}_{=0} + n$$
$$= \underbrace{\hat{H}_i x_i}_{\substack{\text{desired} \\ \text{signal}}} + \underbrace{\sum_{j=1, j \neq i}^{U} \hat{H}_j x_j}_{\substack{\text{interference} \\ \text{signal}}} + \underbrace{n}_{\text{noise}}$$

The following Equation 3 is obtained by combining Equation 2 with Equation 1 for a transmission method that assumes no interference signal (IS). An arg min[ ] function outputs a value of $\hat{X}_i$ that minimizes a function in brackets ||.

$$\hat{x}_i = \underset{\hat{x}_i}{\operatorname{argmin}} \left\| y_i - \hat{H}_i \hat{x}_i \right\|^2 \quad \text{[Equation 3]}$$
$$= \underset{\hat{x}_i}{\operatorname{argmin}} \left\| \hat{H}_i (x_i - \hat{x}_i) + \sum_{j=1, j \neq i}^{U} \hat{H}_j x_j + n \right\|^2$$

In the transmission method that assumes no interference signal (IS), only reception of the desired signal (DS) is assumed, and therefore performance of the WLAN system 100 may be reduced due to the interference signal (IS). In the driving method of the WLAN station according to an embodiment of the present invention all of the desired signal (DS) and the interference signal (IS) are detected by expanding the conventional method of detecting only the desired signal (DS), thereby enhancing performance.

In Equation 3, when $\hat{X}_i$ is substituted for $\hat{X}$, an object to be detected, the following Equation 4 is obtained.

$$\hat{x} = \underset{\hat{x}}{\operatorname{argmin}} \left\| y_i - \hat{H} \hat{x} \right\|^2 \quad \text{[Equation 4]}$$
$$= \underset{\hat{x}}{\operatorname{argmin}} \left\| \hat{H}(x - \hat{x}) + n \right\|^2$$

As can be seen from Equation 4, the influence of the interference signal (IS) may be removed by detecting the interference signal (IS) that exists in Equation 2 together with the desired signal (DS).

The WLAN station according to an embodiment of the present invention additionally detects the interference signal (IS), and remove the detected interference signal (IS) to reduce the influence of the interference signal (IS), thereby enhancing reception performance.

The driving method of the WLAN station according to an embodiment of the present invention includes a selection method of the interference signal so as to reduce complexity of a sphere decoding (SD) method. A method of additionally detecting the interference signal includes a detection method in a channel ordering and interference stream selection part, a virtual channel generation part in which the desired signal and the interference signal are combined, and the generated virtual channel.

In order to use the conventional sphere decoding (SD) method by adding the interference signal in the WLAN station according to an embodiment of the present invention, the rank of a channel matrix is required to be increased.

The following Equation 5 indicates the cost metric of a detection method including the desired signal (DS) and the interference signal (IS).

$$\hat{x} = \arg\min_{\hat{x}} \|y_i - \hat{H}\hat{x}\|^2 \quad \text{[Equation 5]}$$

The following Equation 6 indicates a case in which the cost metric is applied in a rank-deficient situation in Equation 5. The rank-deficient situation corresponds to a case in which the number of antennas of the first or second WLAN station 121 or 122 is smaller than the number of antennas of a transmitter (that is, AP 110).

$$\hat{x} = \arg\min_{\hat{x}} \|D(G^{-1}\hat{H}y - \hat{x})\|^2 \text{ where } G = \hat{H}^H\hat{H} + \alpha I = D^H D \quad \text{[Equation 6]}$$

where $G = \hat{H}^H\hat{H} + \alpha I = D^H D$

Figure 3:
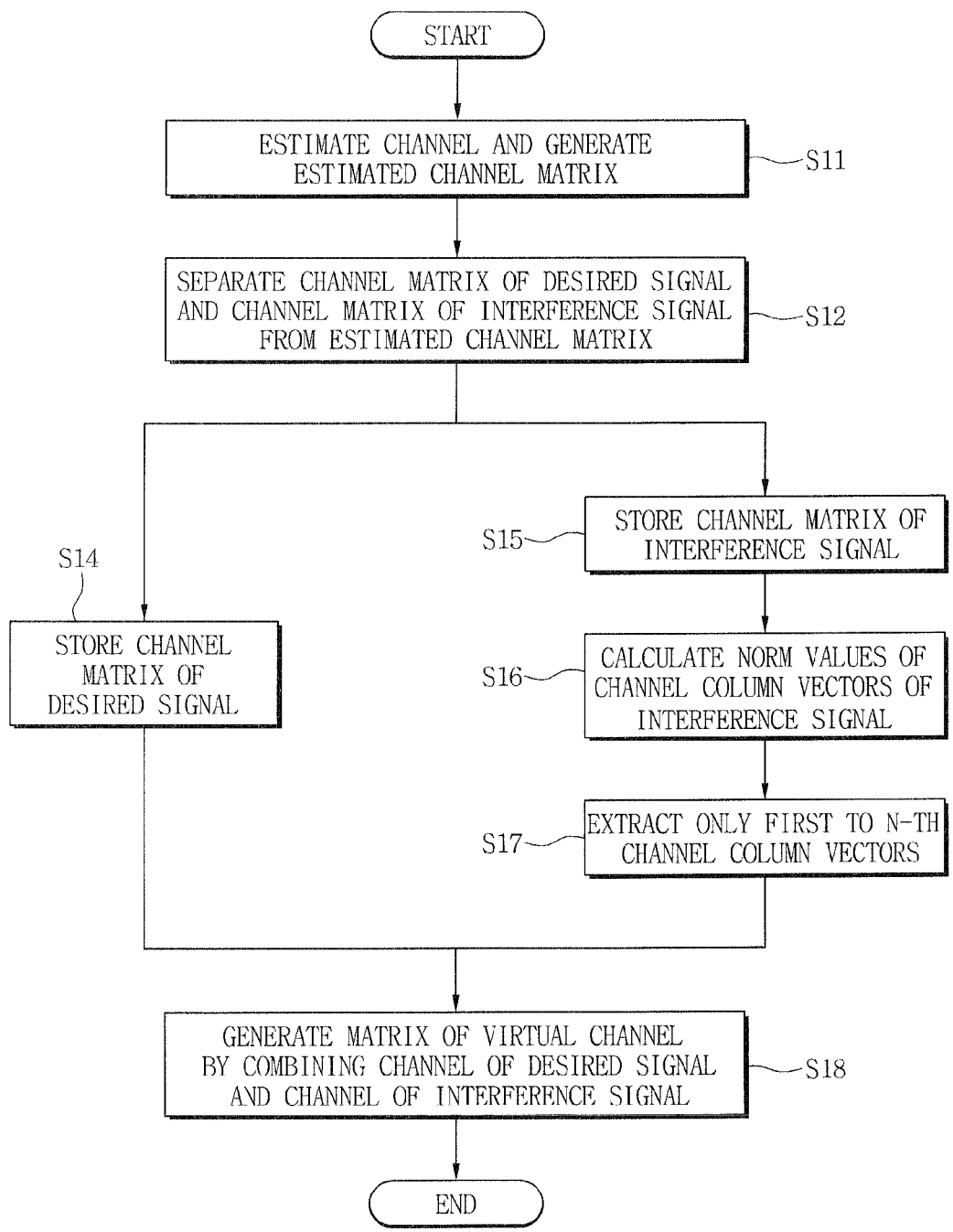
FIG. 3 is a flowchart of an operation method of a WLAN station in accordance with an exemplary embodiment of the inventive concept.

FIG. 3 is a flowchart of an operation method of the WLAN station of FIG. 1 in accordance with an exemplary embodiment of the inventive concept.

Referring to FIGS. 2 and 3, the driving method of the WLAN station in accordance with the first embodiment of the inventive concept separates an estimated channel matrix into a channel of the desired signal (DS) and a channel of the interference signal (IS), and then extracts N channel column vectors on the basis of Norm values of channel column vectors with respect to the interference signal (IS). The matrix of a virtual channel may be generated by combining the channel of the desired signal (DS) and the channel of the extracted interference signal (IS).

For example, the following Equation 7 shows a case in which the channel $H_D$ of the desired signal (DS) and the channel $H_I$ of the interference signal are separated from the estimated channel matrix $\hat{H}$. An arg max function outputs a value of $\tilde{H}_I$ that maximizes a function in brackets.

$$\hat{H} = [H_D H_I]$$

$$H_D = \hat{H}_i$$

$$H_I[\hat{H}_j]_{j=1\ldots U, j\neq i} \quad \text{[Equation 7]}$$

$$\tilde{H}_I = [\tilde{H}_{I,1} \ldots \tilde{H}_{I,N}] = \left\{\arg\max_j \max_k \|[H_I]_j\|^2\right\}_{k=1-N} \quad \text{[Equation 8]}$$

where $[H]_j$ is jth column vector of H and $$\max_k$$

means kth largest value

In order to preferentially remove the interference signal (IS) having a large size, the driving method of the WLAN station selects N channel column vectors with respect to the channel matrix of the interference signal (IS) of Equation 7 in a descending order of Norm values using Equation 8, and configures the channel matrix $\tilde{H}_I$ of the extracted interference signal (IS) by combining the selected N channel column vectors.

M is the total number of interference signals (IS). The performance of the WLAN station may be enhanced as the value of M is increased. However, the increase in the value of M may cause an increase in complexity. Accordingly, the value of M may be variably selected depending on an environment.

The matrix $\tilde{H}$ of the virtual channel may be finally generated in such a manner that the channel of the desired signal (DS) and the channel matrix $\tilde{H}_I$ of the interference signal (IS) are combined using the following Equation 9. The SD method may be performed in accordance with Equation 6 using the generated matrix $\tilde{H}$ of the virtual channel.

$$\tilde{H} = [\tilde{H}_D \tilde{H}_I] \quad \text{[Equation 9]}$$

Referring again to FIGS. 2 and 3, in step S11, the AP 110 transmits a stream signal (i.e., data signal) to the first WLAN station 121. The first WLAN station 121 estimates a channel for receiving the desired signal (DS). Based on this, the first WLAN station 121 generates the estimated channel matrix $\hat{H}$. According to a preferred embodiment, estimation of the channel may include a least-square scheme.

In step S12, the first WLAN station 121 separates the channel matrix $H_D$ of the desired signal (DS) and the channel matrix $H_I$ of the interference signal (IS) from the estimated channel matrix $\hat{H}$ in accordance with Equation 7.

The channel matrix $H_D$ of the desired signal (DS) is processed in step S14, and the channel matrix $H_I$ of the interference signal is processed in steps S15 to S17.

In step S14, the first WLAN station 121 stores the channel matrix $H_D$ of the desired signal (DS) separated from the estimated channel matrix $\hat{H}$, and executes step S18.

In step S15, the first WLAN station 121 stores the channel matrix $H_I$ of the interference signal (IS) separated from the estimated channel matrix $\hat{H}$.

In step S16, the first WLAN station 121 calculates Norm values of channel column vectors with respect to the channel matrix $H_I$ of the interference signal (IS).

In step S17, the first WLAN station 121 extracts only the channel column vectors with respect to the channel matrix $H_I$ of the first to N-th interference signals (IS) based on the calculated Norm values.

In step S18, the first WLAN station 121 generates the matrix $\tilde{H}$ of a virtual channel by combining the channel matrix $\tilde{H}_D$ of the desired signal (DS) and the channel matrix $\tilde{H}_I$ of the extracted interference signal (IS).

The first WLAN station 121 receives a stream signal from the AP 110 using the matrix $\tilde{H}$ of the virtual channel.

Accordingly, the first WLAN station 121 can receive the stream signal without the influence of the interference signal.

Figure 4:
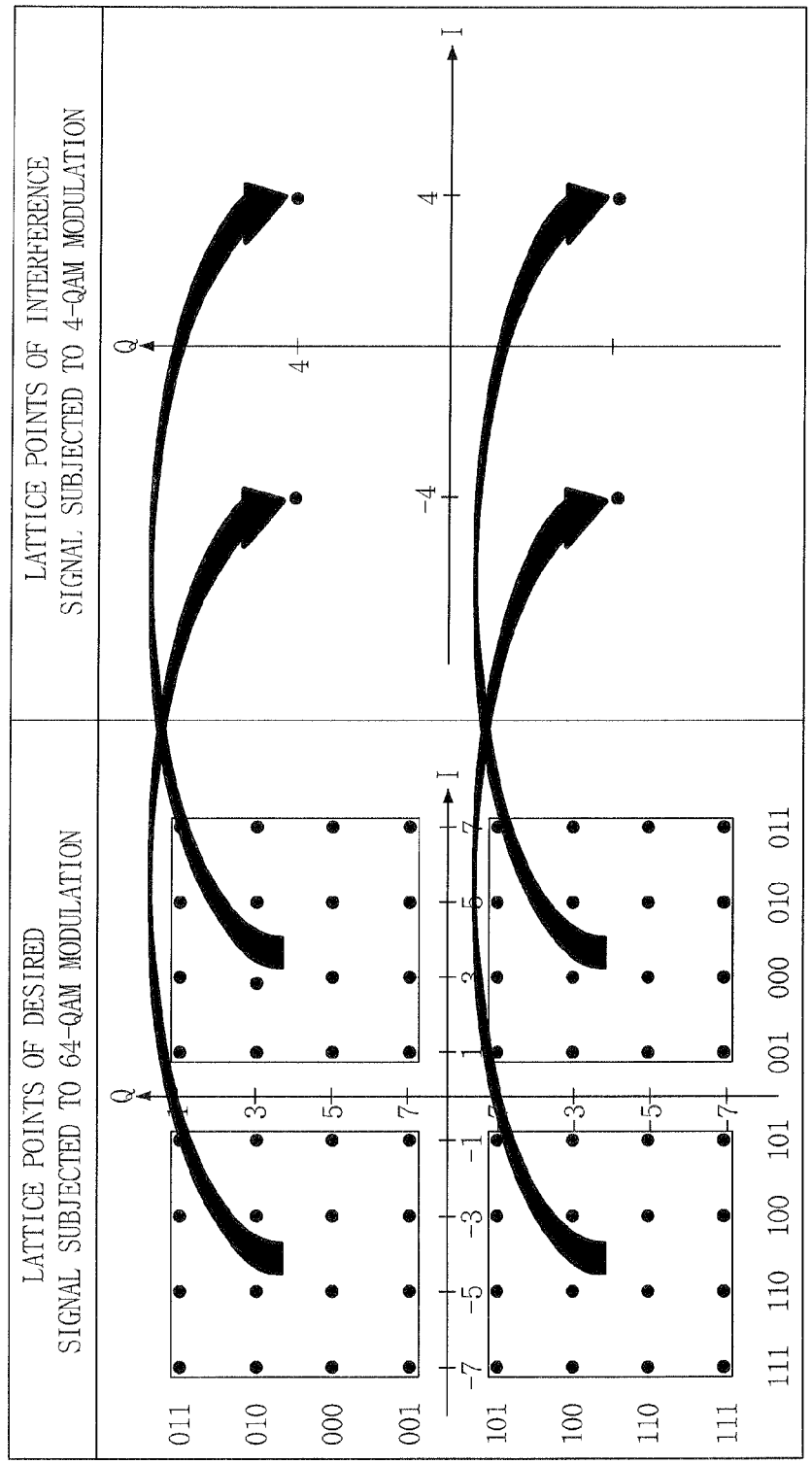
FIG. 4 is a diagram illustrating lattice points with respect to each of desired signals and interference signals which are modulated to 64 QAM.

FIG. 4 is diagram illustrating lattice points with respect to each of desired signals and interference signals which are modulated to 64-quadrature amplitude modulation (QAM).

QAM is a method of changing (i.e., modulating) the amplitude and the phase of a carrier wave in accordance with digital signals.

Referring to FIGS. 2 and 4, the driving method of the WLAN station according to an embodiment of the present invention detects the desired signal (DS) in an original lattice points method, and detects the interference signal (IS) in a decreased lattice points method. The decreased lattice points method is a method of detecting the interference signal (IS) in accordance with a low modulation scheme. Through this, the complexity of the WLAN station according to an embodiment of the present invention may be reduced.

According to an exemplary embodiment, the original lattice points method includes 64 QAM lattice points, and the decreased lattice points method includes 4 QAM lattice points.

The detection of the interference signal (IS) is performed for the purpose of removal of the interference signal (IS), and therefore the detection of the interference signal (IS) does not require accurate detection of a symbol of the interference signal (IS). Accordingly, the detection of the interference signal (IS) may be performed in other modulation schemes rather than an original modulation scheme. For example, the detection of the interference signal (IS) may be performed in the same 64 QAM lattice point scheme as the detection of the desired signal (DS), but alternatively may be performed in a 4 QAM lattice point scheme lower than the 64 QAM lattice point scheme.

Since a value of the interference signal (IS) is significantly smaller than that of the desired signal (DS), errors that occur in the detection of the interference signal (IS) may have very small values. Thus, the interference signal (IS) is detected in the modulation scheme lower than the original modulation scheme, and therefore performance of the WLAN station (that is, first or second WLAN station 121 or 122) is not significantly reduced.

The reduced number of lattice points that is reset in the lower modulation scheme is significantly reduced compared to the original number of lattice points, thereby reducing complexity.

As shown in an example of FIG. 4, the complexity may theoretically be reduced by $(1/16)^M$, where M is the number of the interference signals.

Figure 5:
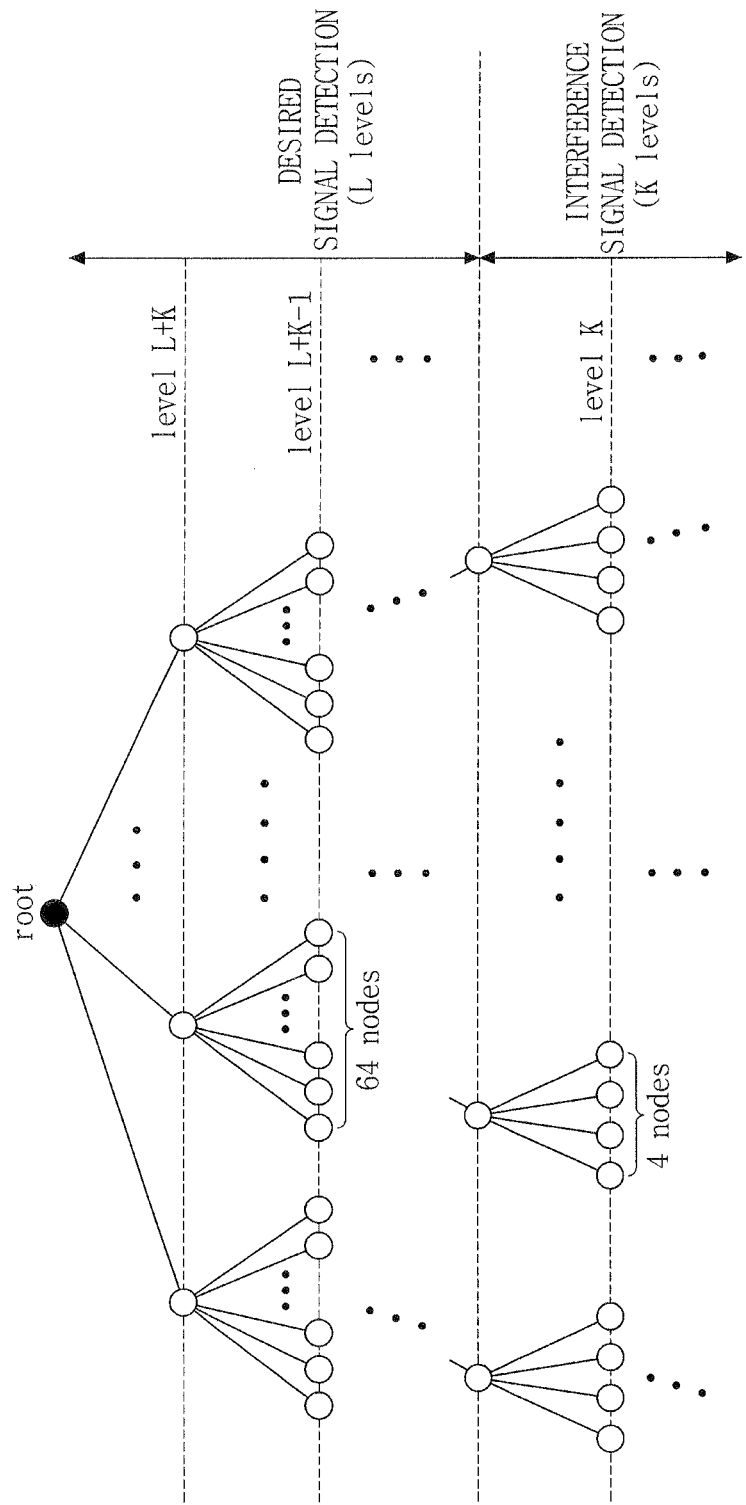
FIG. 5 is a conceptual diagram illustrating detection levels in accordance with a modulation scheme of the desired signals and a modulation scheme of the interference signals shown in FIG. 4.

FIG. 5 is a conceptual diagram illustrating detection levels in accordance with a modulation scheme of the desired signals and a modulation scheme of the interference signals shown in FIG. 4.

Referring to FIGS. 2, 4, and 5, when a detection level of the desired signal (DS) is L, detection of the interference signal (IS) may be set to a K level lower than an L level. For example, in FIG. 4, the interference signal (IS) may be expressed by four nodes only through phase information. On the other hand, in FIG. 4, the desired signal (DS) may be expressed by 64 nodes through phase information and size (amplitude) information.

Figure 6:
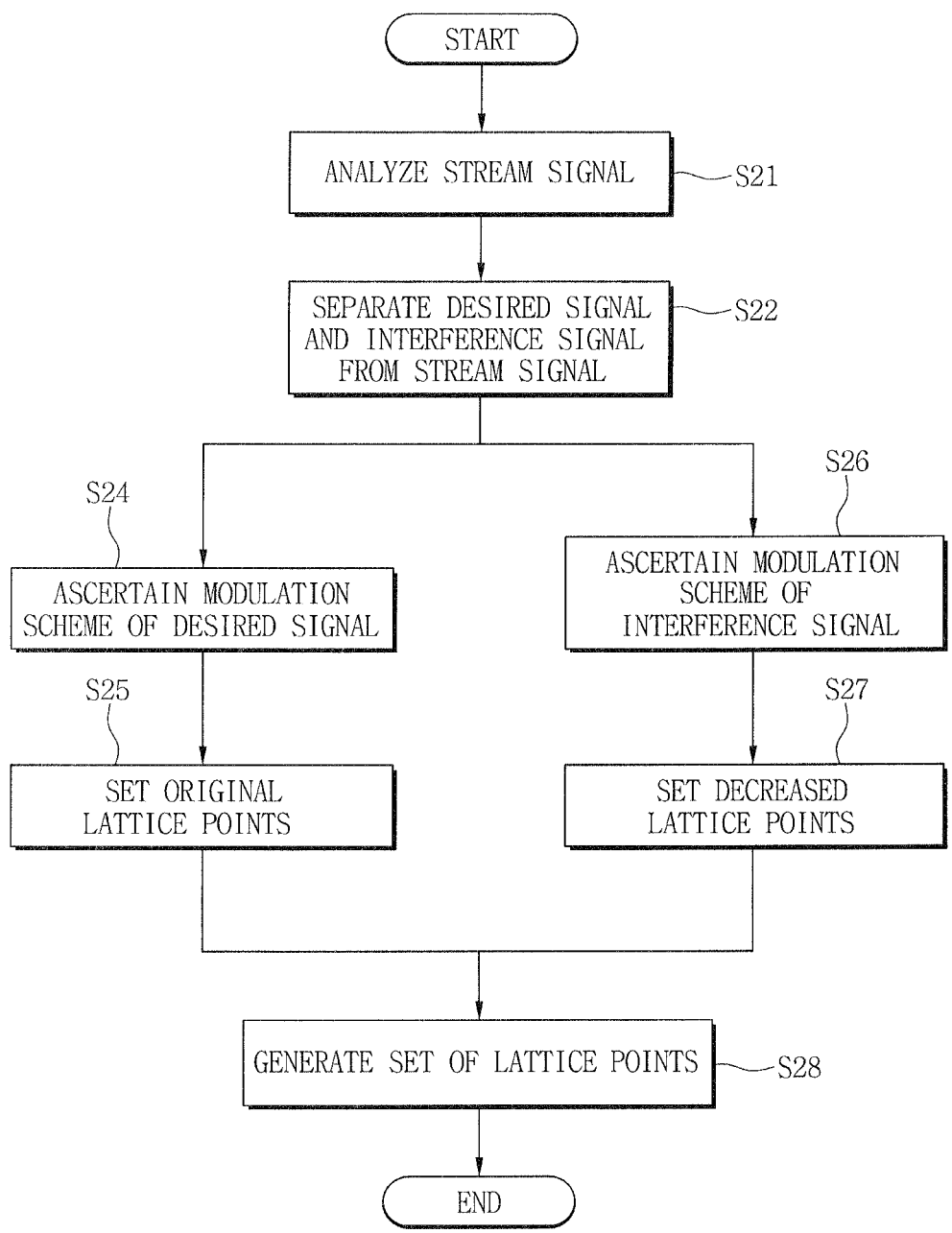
FIG. 6 is a flowchart of an operation method of a WLAN station in accordance with an exemplary embodiment of the inventive concept.

FIG. 6 is a flowchart of an operation method of a WLAN station in accordance with an exemplary embodiment of the inventive concept.

Referring to FIGS. 2 and 6, in step S21, when it is assumed that the first WLAN station 121 receives a stream signal from the AP 110, the first WLAN station 121 analyzes the stream signal.

In step S22, the first WLAN station 121 separates the desired signal (DS) and the interference signal (IS) from the stream signal based on the analysis result.

When the separated signal is the desired signal (DS), steps S24 and S25 are performed, and otherwise, steps S26 and S27 are performed.

The desired signal (DS) is processed in steps S24 and S25, and the interference signal (IS) is processed in steps S26 and S27.

In step S24, the first WLAN station 121 ascertains the modulation scheme of the desired signal (DS).

In step S25, the first WLAN station 121 sets the desired signal (DS) as original lattice points based on the result of ascertaining the modulation scheme. According to an exemplary embodiment, the original lattice points are set as 64 lattice points.

In step S26, the first WLAN station 121 ascertains the modulation scheme of the interference signal (IS).

In step S27, the first WLAN station 121 sets the interference signal (IS) as a reduced number of lattice points based on the result of ascertaining the modulation scheme. According to an exemplary embodiment, the reduced number of lattice points is set as 4 lattice points.

In step S28, the first WLAN station 121 generates a set of lattice points by combining a set of the original lattice points and the reduced number of lattice points.

The first WLAN station 121 may detect the stream signal based on the set of lattice points. For example, the first WLAN station 121 detects the desired signal (DS) based on 64 lattice points, and the interference signal (IS) based on 4 lattice points. Accordingly, the first WLAN station 121 can reduce the complexity of the method of detecting the interference signal (IS).

Figure 7:
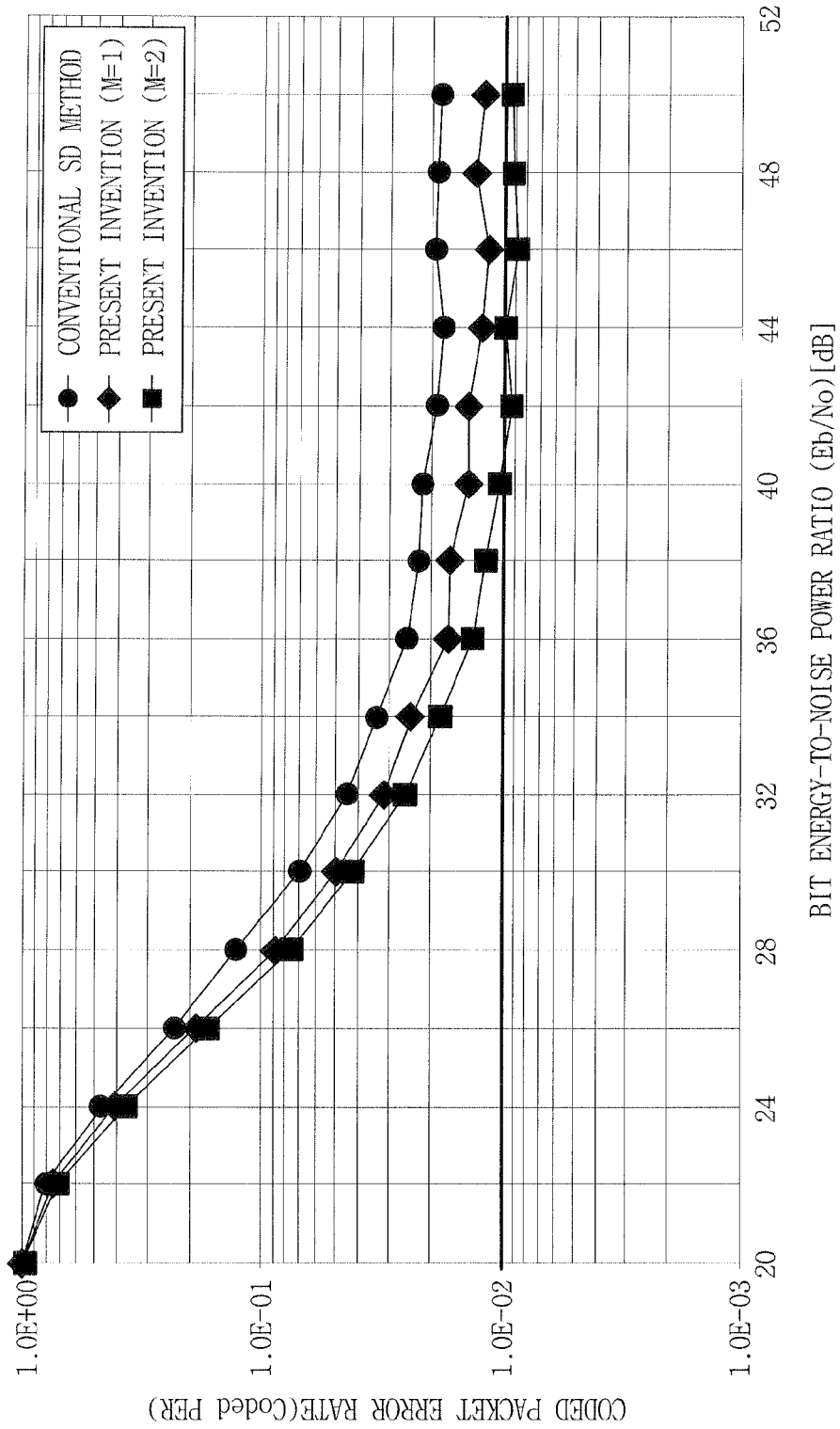
FIG. 7 is a graph illustrating comparative performance of the WLAN station shown in FIG. 2 operated under a conventional SD method and under two exemplary embodiments of the inventive concept.

FIG. 7 is a graph illustrating comparative performance of the WLAN station shown in FIG. 2 operated under a conventional SD method and under two exemplary embodiments of the inventive concept.

Referring to FIGS. 2 and 7, the horizontal axis indicates a bit energy-to-noise power ratio (Eb/N0), and the vertical axis indicates a packet error rate (PER).

As a simulation environment, the a WLAN station is based on an IEEE 802.11ac system, bits of channel quantization create an error of precoding using four types, each of four WLAN stations uses two antennas, and all of transmitting stations use MCS7 (64 QAM, 5/6 coding rate). In addition, a least squares scheme is used in estimation of the channel.

graphed and compared in FIG. 7, are the using of the conventional SD method (without considering the interference signal and a quadrature phase shift keying (QPSK) method), and a method of detecting and removing one interference signal (M=1) and a method of detecting and removing two interference signals (M=2).

The QPSK method, a type of phase shifting keying (PSK), gathers 2 bits of 0 and 1 which are digital signals, associates the bits with four phases of a carrier wave, and transmits the association result.

It can be seen that performance is further enhanced in the method (M=1 & M=2) of detecting and removing the interference signal compared to the conventional SD method (without considering the interference signal). In addition, as the number M of interference signals to be detected and removed increases (e.g., N−1→N2), performance can be further enhanced.

In addition, the WLAN station according to embodiments of the present invention can reduce the overall error rate and the error floor phenomenon that occurs in a high bit energy-to-noise power ratio (Eb/N0).

In addition, when the number of the interference signals is 2 (M=2), the WLAN station can reach a packet error rate (PER) of 1% in simulation.

The driving method of the WLAN station according to embodiments of the present invention can additionally detect the interference signal, and remove the detected interference signal to reduce influence of the interference signal, thereby enhancing reception performance.

The foregoing is illustrative of exemplary embodiments and is not to be construed as limiting the inventive concept. Although a few embodiments have been described, those skilled in the art will readily appreciate that many modifications are possible in embodiments without materially departing from the teachings. Accordingly, all such modifications are intended to be included within the scope of this inventive concept as defined in the claims. Therefore, it is to be understood that the foregoing is illustrative of various embodiments and is not to be construed as limited to the specific exemplary embodiments disclosed, and that modifications to the disclosed embodiments, as well as other embodiments, are intended to be included within the scope of the appended claims.

What is claimed is:

1. An operating method of a wireless local area network (WLAN) station configured to receive a desired signal and at least one interference signal through each of at least two station antennas from an access point (AP) including at least two AP antennas and supporting down-link (DL) multiple user multiple input multiple output (MU-MIMO), the method comprising:
    estimating a channel and generating an estimated channel matrix based on the estimated channel;
    separating a channel matrix of the desired signal and a channel matrix of the interference signal from the estimated channel matrix;
    detecting the desired signal using the separated channel matrix of the desired signal;
    detecting the interference signal using the separated channel matrix of the interference signal;
    creating a precoding matrix using channel state information (CSI);
    multiplying, wherein the multiplying is performed by the AP, the precoding matrix by a stream signal; and
    transmitting, wherein the AP performs the transmitting, the multiplication result to the WLAN station through at least one of the AP antennas.

2. The method according to claim 1, further comprising:
    calculating Norm values of channel column vectors with respect to the channel matrix of the interference signal;
    extracting N channel column vectors in a descending order of the Norm values based on the calculation result;
    generating the channel matrix of the extracted interference signal by combining the extracted N channel column vectors; and
    generating the matrix of a virtual channel by combining the channel matrix of the desired signal and the channel matrix of the extracted interference signal.

3. The method according to claim 2, wherein the detecting of the desired signal and the interference signal includes executing a sphere decoding (SD) algorithm using the matrix of the virtual channel.

4. The method according to claim 2, wherein the calculating of the Norm values includes calculating the size of the channel column vector with respect to the channel matrix of the interference signal.

5. The method according to claim 1, further comprising:
    receiving the stream signal through at least one of the station antennas in accordance with 802.11ac protocol.

6. The method according to claim 1, further comprising:
    modulating, wherein the modulating is performed by the AP, each of the desired signal and the interference signal in a quadrature amplitude modulation (QAM) scheme.

7. The method according to claim 6, further comprising:
    ascertaining a modulation scheme of each of the desired signal and the interference signal; and
    detecting each of the desired signal and the interference signal using lattice points corresponding to the ascertained modulation scheme.

8. A method of operating a wireless local area network (WLAN) station that receives a stream signal from an access point (AP), and supports down-link multiple user multiple input multiple output (DL MU-MIMO), the method comprising:
    analyzing the stream signal, wherein the analyzing is performed by the WLAN station;
    separating a desired signal and an interference signal from the stream signal based on the analysis result;
    ascertaining a modulation scheme of the interference signal; and
    setting the ascertained modulation scheme of the interference signal as first lattice points corresponding to a modulation scheme having fewer lattice points than the ascertained modulation scheme of the interference signal.

9. The method according to claim 8, further comprising:
    ascertaining a modulation scheme of the desired signal; and
    setting the ascertained modulation scheme of the desired signal as second lattice points corresponding to the ascertained modulation scheme of the desired signal.

10. The method according to claim 9, further comprising:
    generating a set of lattice points by combining the first lattice points and the second lattice points.

11. The method according to claim 9, wherein the setting of the ascertained modulation scheme of the interference signal as the first lattice points includes setting the ascertained modulation scheme of the interference signal as fewer lattice points than the second lattice points.

12. The method according to claim 11, further comprising:
    detecting the interference signal using the first lattice points.

13. The method according to claim 9, wherein the setting of the ascertained modulation scheme of the desired signal as the second lattice points includes setting the ascertained modulation scheme of the desired signal as lattice points corresponding to the ascertained modulation scheme of the desired signal.

14. The method according to claim 13, further comprising:
    detecting the desired signal using the second lattice points.

15. A wireless local area network (WLAN) station, wherein the station is configured to receive a desired signal and at least one interference signal through each of at least two station antennas from an access point (AP) including at least two AP antennas and supporting down-link (DL) multiple user multiple input multiple output (MU-MIMO), wherein the station is configured to perform a method comprising the following steps:
    estimating a channel and generating a estimated channel matrix based on the estimated channel;
    separating a channel matrix of the desired signal and a channel matrix of the interference signal from the estimated channel matrix; and
    detecting the desired signal using the separated channel matrix of the desired signal;
    detecting the interference signal using the separated channel matrix of the interference signal;
    creating a precoding matrix using channel state information (CSI);
    multiplying, wherein the multiplying is performed by the AP, the precoding matrix by a stream signal; and
    transmitting, wherein the AP performs the transmitting, the multiplication result to the WLAN station through at least one of the AP antennas.

16. The station of claim 15, wherein the method further comprises:
    calculating Norm values of channel column vectors with respect to the channel matrix of the interference signal;
    extracting N channel column vectors in a descending order of the Norm values based on the calculation result;

generating the channel matrix of the extracted interference signal by combining the extracted N channel column vectors; and generating the matrix of a virtual channel by combining the channel matrix of the desired signal and the channel matrix of the extracted interference signal.

17. The station of claim 16, wherein the detecting of the desired signal and the interference signal includes executing a sphere decoding (SD) algorithm using the matrix of the virtual channel.

18. The station of claim 16, wherein the calculating of the Norm values includes calculating the size of the channel column vector with respect to the channel matrix of the interference signal.

19. An access point (AP) of a wireless local area network (WLAN), wherein a station of the WLAN is configured to receive a desired signal and at least one interference signal through each of at least two station antennas from the access point (AP) including at least two AP antennas and supporting down-link (DL) multiple user multiple input multiple output (MU-MIMO), wherein the AP is configured to perform a method comprising the following steps:

multiplying a precoding matrix by a stream signal, wherein the precoding matrix is created using channel state information (CSI);

transmitting the multiplication result to the WLAN station through at least one of the AP antennas; and modulating each of the desired signal and the interference signal in a quadrature amplitude modulation (QAM) scheme.

20. The access point (AP) of claim 19, wherein the method further comprises:

ascertaining a modulation scheme of each of the desired signal and the interference signal.

* * * * *